Patented Nov. 3, 1936

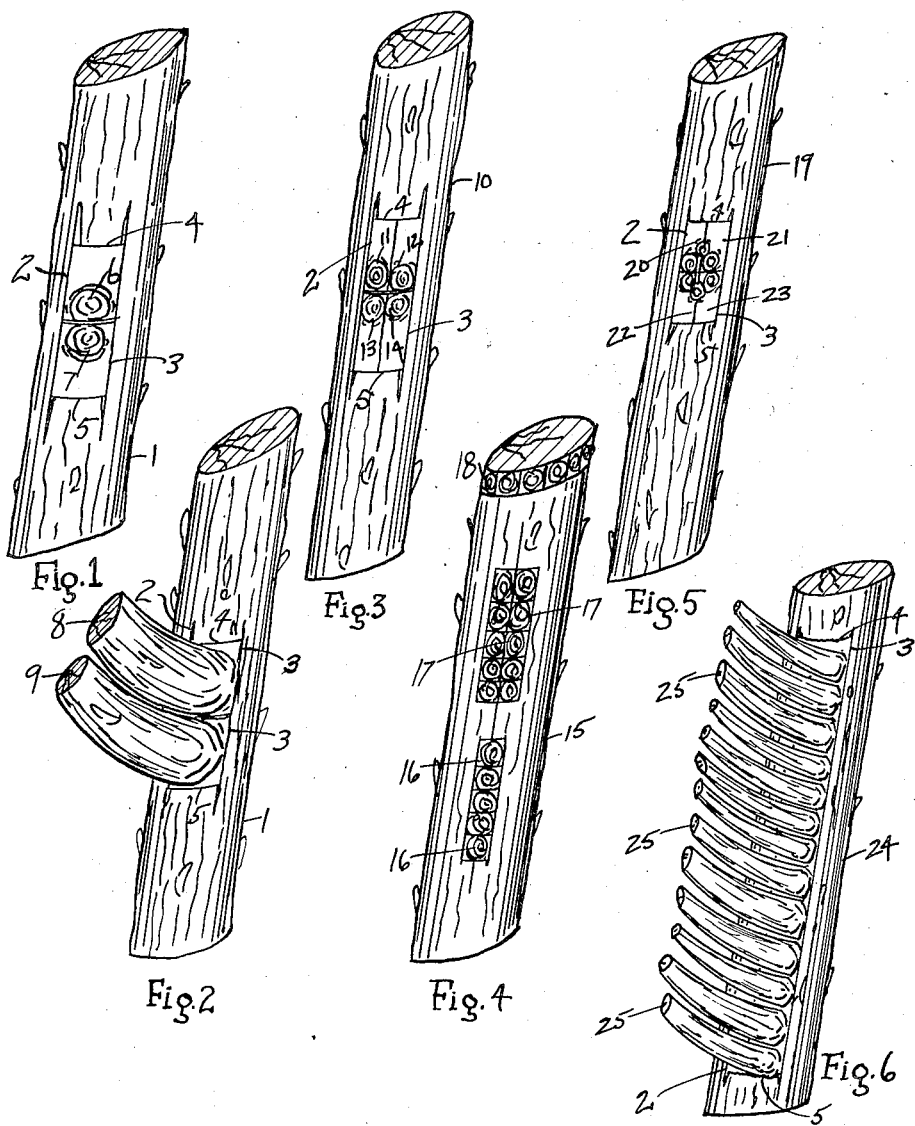

2,059,812

UNITED STATES PATENT OFFICE 2,059,812

METHOD OF GRAFTING OR WELDING

Rosario Scaglione, Girard, Ohio

Application July 24, 1936, Serial No. 92,415

6 Claims. (Cl. 47—6)

This invention relates to a method of grafting or welding one plant, tree, or bush to another.

The principal object of this invention is to provide a method of successfully grafting or welding a large number of new sections in a relatively small section of any stem, branch, or trunk.

A further object of this invention is to provide a method of grafting or welding any possible combination of new sections such as different colored roses in an artistic arrangement.

A further object of this invention is to provide a method of grafting or welding which will produce a display of living roses resembling the American flag.

By using my method of welding or grafting it is possible to "weld" a great many different varieties or colors of roses to one main stem in a much smaller space than is possible in any other method. By using the eyes of different species of roses in different positions on one stem it is possible to build many different designs and displays of living roses in various colors. If desired, a display resembling the American flag may be produced by grafting thirteen new sections of alternating red and white roses.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing wherein:—

Figure 1 is a perspective view of a section of a rose stem showing my new method of welding or grafting, two eyes being shown positioned in the rose stem.

Figure 2 is a perspective view of the results of the weld shown in Figure 1, two new shoots being shown.

Figure 3 is a perspective view of a section of a rose stem, showing my new method of welding or grafting, four eyes being shown positioned in the stem.

Figure 4 is a perspective view of a section of a rose stem showing my new method of grafting or welding wherein a plurality of eyes are shown positioned in the stem in a double row and in a circular band around the stem, as well as in a single row.

Figure 5 is a perspective view of a section of a rose stem, showing my new method of welding or grafting, six eyes being shown positioned in the stem.

Figure 6 is a perspective view of the results of a weld for producing a display resembling the American flag, wherein thirteen eyes have been positioned in the rose stem.

In the drawings it will be seen that I have shown the simplest method of using my improved manner of grafting or welding. By referring to Figures 1, 2, 3, 5, and 6 it will be seen that there is shown a stem which has been slit lengthwise in two places designated by numbers 2 and 3. These slit portions of the stem have been cut in the center and peeled back in both directions and then cut as designated at numbers 4 and 5, thus leaving a trough in the stem.

In Figure 1 two sections of different varieties containing eyes 6 and 7 have been inserted in the trough formed in the stem 1 as shown. The wound is then bound with ordinary graft binding material. Figure 2 shows the results. Fragmentary shoots 8 and 9 are shown growing from the eyes 6 and 7, both in a small section of the stem 1.

By referring to Figure 3 it will be seen that there is shown a stem 10 having positioned therein four transferred sections having eyes designated as 11, 12, 13, and 14. The chief difference in this form is in that the eye sections are cut narrower than those shown in Figure 1. It will also be seen that the sections are so cut and placed that the eyes are in close proximity to each other.

By referring to Figure 4 it will be seen that there is shown a stem 15 having positioned therein a plurality of sections 16 positioned in a vertical row and each having an eye. It will be seen that this same stem 15 is provided with two vertical rows 17 each having a plurality of sections similar to the row formed by the sections 16, the two rows being adjacent to each other. This stem 15 is also provided with a relatively small circular band 18 having a plurality of sections each containing an eye.

By referring to Figure 5 it will be seen that there is shown a stem 19 having positioned therein four transferred sections designated as 20, 21, 22, and 23, each section having an eye. The sections are so cut and placed that the eyes are in close proximity to each other. It will also be seen that an eye has been transferred and placed between the sections 20 and 21 above the eyes in said sections, and that an eye has been placed between the sections 22 and 23 below the eyes in those sections.

By referring to Figure 6 it will be seen that there is shown a stem 24 having thirteen fragmentary shoots 25 which are the result of the grafting or welding of thirteen sections having eyes placed in a vertical line on the stem 24. These shoots 25 may be alternated with a species of red and white roses to simulate the stripes of the American flag.

In all of the grafts or welds shown the wound is bound with ordinary graft binding material.

By using this method of welding or grafting it is possible to place almost an indefinite number of different variations on any stem or branch and it is possible to use this method successfully on any bush, tree, or plant.

What I claim is:—

1. A method of grafting or welding a plant in which the stem is split lengthwise in two places and cut and peeled back in both directions, where each section is cut again, thus leaving a rectangular opening into which is inserted a plurality of new sections, each having an eye.

2. A method of grafting or welding a tree in which the bark of the trunk is split lengthwise in two places and cut and peeled back in both directions, where each section is cut again, thus leaving a rectangular opening into which is inserted a plurality of new sections, each having an eye.

3. A method of grafting or welding a rose in which the stem is split lengthwise in two places and cut in the center and peeled back in both directions, where each section is cut again, thus leaving a rectangular opening into which is inserted a plurality of new sections, each having an eye.

4. A method of grafting or welding a rose in which the stem is split lengthwise in two places and cut in the center and peeled back in both directions, where each section is cut again, thus leaving a rectangular opening into which is inserted a double row of new sections, each having an eye, a plurality of sections inserted likewise in the stem in the form of a circular band, each of said sections containing an eye.

5. A method of grafting or welding a rose in which the stem is split lengthwise in two places and cut in the center and peeled back in both directions, where each section is cut again, thus leaving a rectangular opening into which is inserted four new sections, each having an eye, said sections so cut and placed that the eyes are in close proximity to each other, an eye placed between said upper sections and slightly above the eyes in said upper sections and an eye placed between the lower sections and below the eyes in said lower sections.

6. A method of grafting or welding a rose in which a display of living roses simulating the American flag may be produced, in which method the stem is split lengthwise in two places and cut in the center and peeled back in both directions, where each section is cut again, thus leaving a rectangular opening into which is inserted thirteen sections containing eyes, seven of which are of a red species and the alternating six of a white species of rose.

ROSARIO SCAGLIONE.